United States Patent
Jeon et al.

(10) Patent No.: US 8,005,915 B2
(45) Date of Patent: Aug. 23, 2011

(54) METHOD FOR PROVIDING DOWNLOAD AND UPLOAD SERVICE IN NETWORK CONTROL SYSTEM

(75) Inventors: Woong Jeon, Seoul (KR); Jong Hoon Chung, Gunpo-si (KR); Sang Kyun Lee, Seoul (KR); Koon Seok Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 411 days.

(21) Appl. No.: 11/883,794

(22) PCT Filed: Feb. 7, 2006

(86) PCT No.: PCT/KR2006/000434
§ 371 (c)(1),
(2), (4) Date: Apr. 15, 2008

(87) PCT Pub. No.: WO2006/083147
PCT Pub. Date: Aug. 10, 2006

(65) Prior Publication Data
US 2009/0031177 A1 Jan. 29, 2009

(30) Foreign Application Priority Data
Feb. 7, 2005 (KR) .................. 10-2005-0011145

(51) Int. Cl.
*G06F 15/16* (2006.01)
(52) U.S. Cl. ......... 709/208; 709/209; 709/210; 709/211
(58) Field of Classification Search ........... 709/208–211
See application file for complete search history.

(56) References Cited

U.S. PATENT DOCUMENTS

| | | | | |
|---|---|---|---|---|
| 5,751,951 A * | 5/1998 | Osborne et al. | ............... | 709/250 |
| 5,946,687 A * | 8/1999 | Gehani et al. | ............... | 1/1 |
| 6,457,175 B1 * | 9/2002 | Lerche | ............... | 717/173 |
| 6,907,042 B1 * | 6/2005 | Oguchi | ............... | 370/412 |
| 2002/0178274 A1 * | 11/2002 | Kovacevic | ............... | 709/231 |
| 2002/0188691 A1 * | 12/2002 | Ignatius et al. | ............... | 709/208 |
| 2004/0249948 A1 * | 12/2004 | Sethi et al. | ............... | 709/227 |

FOREIGN PATENT DOCUMENTS

| | | |
|---|---|---|
| CN | 1747415 | 3/2006 |
| CN | 1767479 | 5/2006 |
| WO | WO 2004/107093 A2 | 12/2004 |
| WO | WO 2004/107710 A1 | 12/2004 |

* cited by examiner

*Primary Examiner* — Aaron Strange
*Assistant Examiner* — Brian P Whipple
(74) *Attorney, Agent, or Firm* — McKenna Long & Aldridge, LLP

(57) ABSTRACT

The present invention relates to a method for providing a download and upload service using variable length packet communication in a living network control system. A user located inside or outside a house controls or monitors operations or operation states of various appliances such as refrigerator or laundry machine through a living network installed at home, such as a RS-485 network, small output network, or power line network so that convenience of remote control and supervision can be provided to a user. Further, in a case where a download or upload service is executed in a living network in which various appliances connected thereto, variable length packet communication, which is capable of dividing data by the buffer size of a device, and then sending and assembling the data, is used so that a download and upload service for various appliances connected through the living network can be effectively executed.

10 Claims, 10 Drawing Sheets

Multi-Master and Multi-Slave

FIG. 4

LnCP Layer Structure

FIG. 5

1 Request & 1 Response

FIG. 6

1 Request & Multi- Response

FIG. 7

1 Notification

Slave Application Layer Download

METHOD FOR PROVIDING DOWNLOAD AND UPLOAD SERVICE IN NETWORK CONTROL SYSTEM

This application claims priority to International application No. PCT/KR2006/000434 filed on Feb. 7, 2006, and Korean Application No. 10-2005-0011145 filed on Feb. 7, 2005, both of which are incorporated by reference, as if fully set forth herein.

1. TECHNICAL FIELD

The present invention relates to a method for providing a download and upload service in a network control system, by which a user, for example, who is locating at home or out-of-home can effectively control household appliances such as refrigerator or laundry machine connected to a network.

2. BACKGROUND ART

In general, 'home network' means a network in which various digital appliances are connected to one another for the user to enjoy economical home services in a convenient and safe way anytime at home or out-of-home, and due to the development of digital signal processing technology, various types of appliances such as refrigerator or laundry machine are being gradually digitalized.

On the other hand, in recent years, home network has been more advanced, since operating system and multi-media technology for appliances has been applied to digital appliances, as well as new types of information appliances have appeared.

Moreover, in a general meaning, a network which is established for providing file exchanges or internet services between personal computers and peripheral devices, a network between appliances for handling audio or video information, and a network established for home automation of various appliances such as refrigerator or laundry machine, appliance control such as remote meter reading, and the like are called a 'living network', for example.

Furthermore, in the network services in which small-scale data transmission for the remote control, or operating state monitoring of the appliances included in the network, for example, various appliances such as refrigerator or laundry machine, is the main object of their communication, each of appliances connected to one another should be directly controlled by a network manager, which is included in the network, with the use of the minimum required communication resources. However, its effective solution has not been provided yet, and thus it is a matter of urgency to provide its solution.

3. DISCLOSURE OF INVENTION

Accordingly, the present invention is devised in consideration of the aforementioned situation, and it is an object of the invention to provide a download and upload service in a network control system, by which a user, for example, who is locating at home or out-of-home can effectively control various appliances such as refrigerator or laundry machine connected to a network by using the minimum required communication resources, and a download and upload service for the appliances can be more effectively implemented at the same time.

In order to achieve the aforementioned object, there is provided a method for providing a download service in a network control system, the method comprising the steps of: receiving a UserDLReq primitive from application software in a master application layer of the network control system; generating communication cycles to be suitable for a buffer size of a device to be downloaded; sending a ReqMsgSend primitive to a network layer as the unit of the generated communication cycle; and generating a UserRes primitive and then sending it to the application software if an executed result of the communication cycle is received from the network layer.

Also, according to another aspect of the present invention for achieving the object, there is provided a method for providing a download service in a network control system, the method comprising the steps of: sequentially recording downloaded communication cycle messages in a previously allocated memory and sending a response message in a slave application layer of the network control system; and determining that the download service is succeeded if download messages are received as many as the TotalPage necessary for download completion.

Also, according to a further aspect of the present invention for achieving the object, there is provided a method for providing an upload service in a network control system, the method comprising the steps of: requesting a slave to send upload data by the DataLength size included in a UserULReq primitive while sequentially increasing PageNo of communication cycles necessary for uploads if the UserULReq primitive is received from application software in a master application layer of the network control system; sending a ReqMsgSend to a network layer while dividing as the unit of each communication cycle; and generating a UserRes primitive and then sending it to the application software if an executed result of each communication cycle is received from the network layer.

Also, according to a still further aspect of the present invention for achieving the object, there is provided a method for providing an upload service in a network control system, the method comprising the steps of: containing upload data in a response message as the unit of a predetermined data length and then sending the response message to a master whenever an upload request message is received in a slave application layer of the network control system; and completing an upload service by sending a response message with no data to the master if a request message is received after all the upload data are sent.

5. MODES FOR CARRYING OUT THE INVENTION

Hereinafter, preferred embodiments of a method for providing a download and upload service in a network control system will be described in detail with reference to the accompanying drawings.

Figure 1:
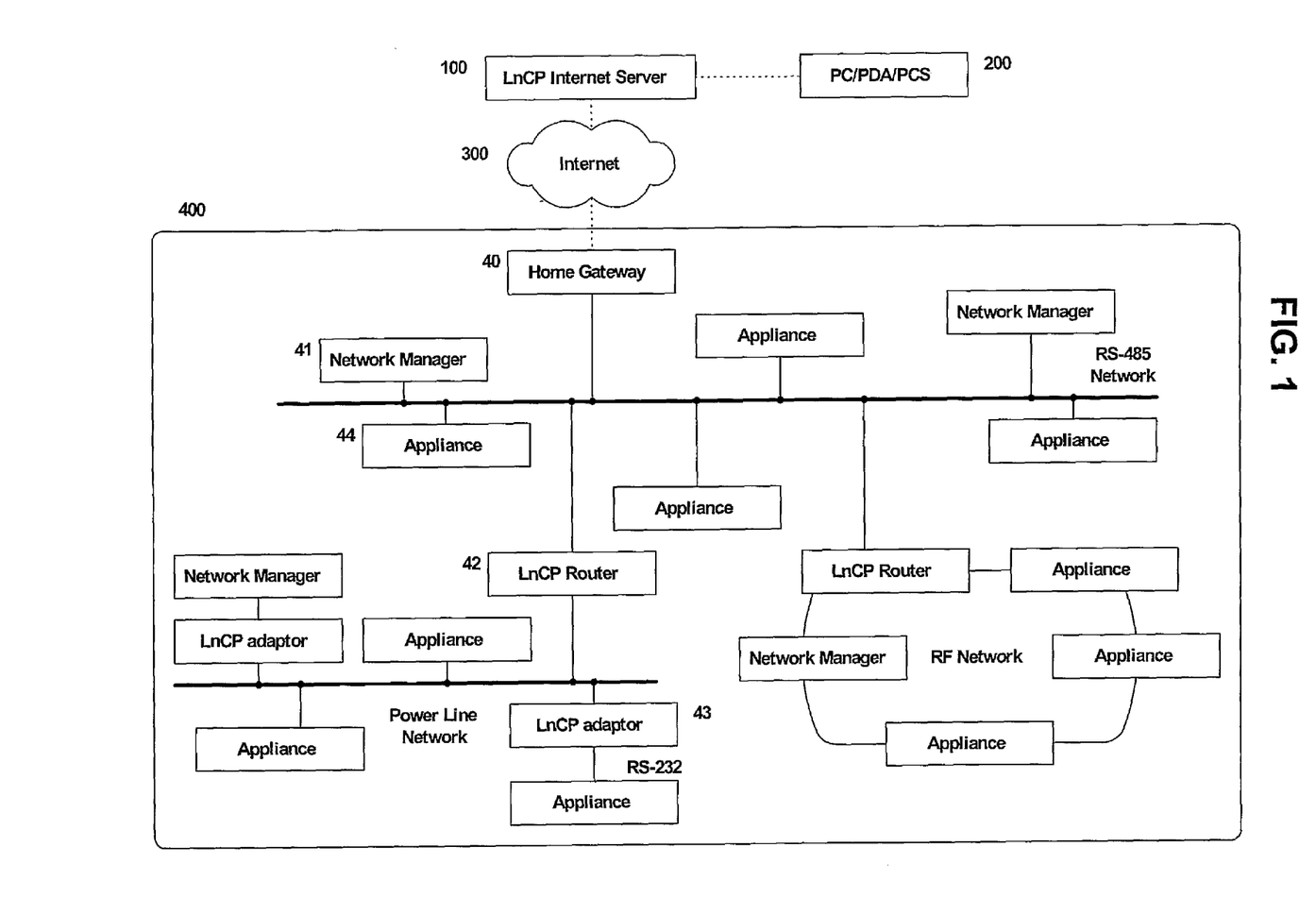
FIG. 1 illustrates a configuration of a network control system according to the present invention.

FIG. 1 illustrates a configuration of a network control system according to the present invention. An LnCP Internet server 100 and a living network control system 400, to which a network control protocol newly defined in the present invention, e.g., an LnCP (Living network Control System) is applied, are connected to each other via Internet 300 as shown in FIG. 1. Further, the LnCP Internet server 100 implements interfaces with a variety of communication terminals 200 such as PCs, PDAs or PCSs.

In the meantime, the living network control system 400 includes a home gateway 40, a network manager 41, an LnCP router 42, an LnCP adaptor 43 and appliances 44. As shown in FIG. 1, the components use a non-standardized transmission method of a data link layer such as an RS-485 network or small output RF network, or a standardized transmission medium of a data link layer such as power line communications or IEEE 802.11.ZigBee (IEEE 802.15.4).

Further, the living network control system 400 is referred to as an "LnCP network", for example. As shown in FIG. 1, the LnCP network is configured as an individual network in which appliances belonging to the category of a living network are connected through a wire or wireless transmission medium at an individual home.

In the meantime, a master device capable of controlling or supervising operations of other appliances, and a slave device with functions of responding to the request of the master device and notifying information on changes of their own states are connected to the LnCP network.

As shown in FIG. 1, the network manager 41 implements a function of environment setting and management of the applices 44 connected to the LnCP network. At this time, the appliances 44 may be connected directly to the network or indirectly to the network via the LnCP adaptor 43, and the RS-485 network, RF network, power line network and the like are connected to the network via the LnCP router 42.

Further, the LnCP network provides a function in that a user located outside a house can identify or control the states of appliances installed at home through a connection with the external Internet 300. Here, the home gateway 40 implements a function of connecting the LnCP network with the external Internet. If the user accesses the Internet server 100 and then passes through an authentication procedure, the user can use a function of identifying or controlling the states of appliances connected to the LnCP network.

In addition, the user can connect to the LnCP Internet server 100 from the appliances connected to the LnCP network via the home gateway 40 and then download contents provided from the LnCP Internet server 100. Main features of the LnCP network for this purpose will be described in detail below.

First, digital information appliances have micro controllers with various performances such that each of them implements their unique function. In the LnCP network according to the present invention, functions are more effectively simplified to operate in such micro controllers with various performances so that the resources of the micro controller built in the appliances can be used at the minimum. In particular, according thereto, micro controllers with low performances can implement not only unique functions of the appliances but also LnCP communication functions, and micro controllers with high performances can support multi-tasking functions.

Further, the main features of the LnCP network according to the present invention may be classified into master-slave based communication structure, event-driven communication support, multiple network manager support, four-layer structure, communication cycle service, flexible address management, variable length packet communication and standard message set offer.

In the meantime, the master-slave based communication structure, which is used as a communication structure for connection between appliances in the LnCP network, should include at least one master device, and the master device should have information on slave devices to be controlled and control codes. At this time, the master device controls another slave device in accordance with a previously input program or through a user's input.

Figure 2:
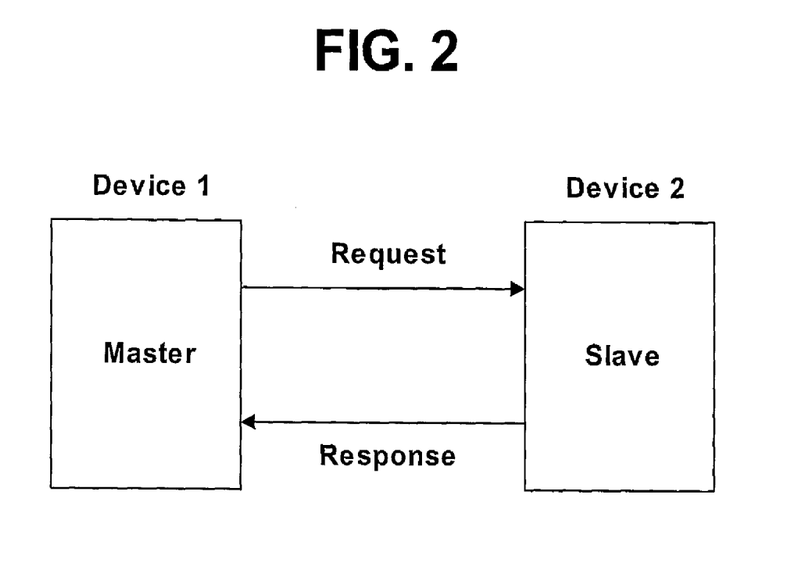
FIGS. 2 and 3 illustrate master-slave based communication structures applied to the present invention.
Figure 3:
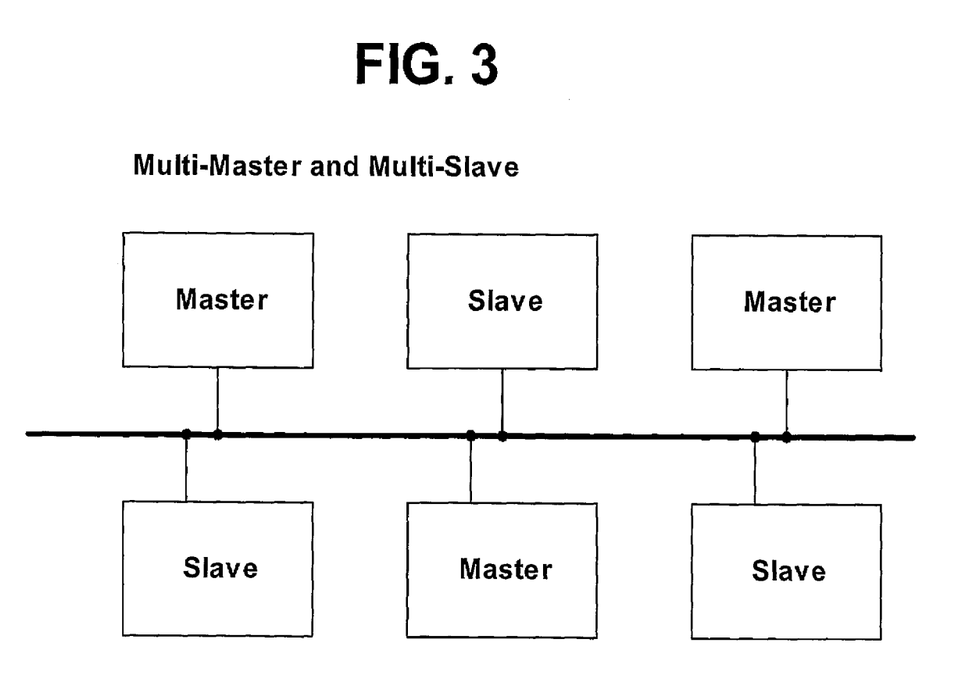

For example, as shown in FIG. 2, the flow of messages between the master and the slave devices is accomplished through a process in that if a request message is sent from the master device to the slave device, the slave device sends a response message thereto to the master device. As shown in FIG. 3, the LnCP network may have a multi-master and multi-slave based communication structure.

In addition, the LnCP network supports an event-driven communication service, and a user, for example, can set an event required to an appliance. Then, if there occurs an event set by the user in an appliance while performing a certain operation, the correspondent appliance notifies the fact or content that the event occurs to another appliance or controls the operation state of another appliance.

Further, the LnCP network includes at least one network manager for implementing a function of environment setting and management of appliances and may support a plurality of network managers as occasion demands. In this case, the management information of the appliances should be synchronized to provide for errors produced from the plurality of network managers.

Figure 4:
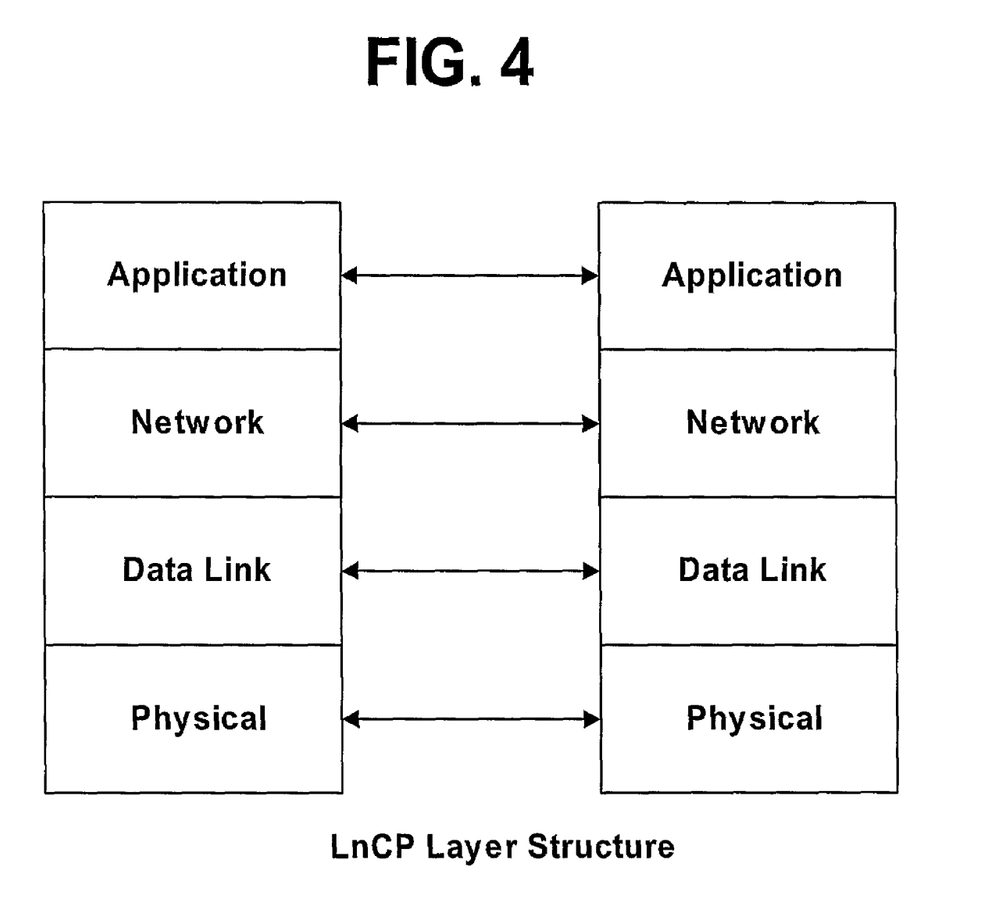
FIG. 4 illustrates a hierarchical structure of an LnCP network applied to the present invention.

Furthermore, as shown in FIG. 4, the LnCP network has a four-layer structure comprising a physical layer, a data link layer, a network layer and an application layer. In the LnCP network, a service is provided by the communication cycle, while there may be only one communication cycle at a given time point in the slave device.

That is, although one slave device cannot been controlled by any master devices while a communication cycle is being executed in the slave device, a plurality of communication cycles for a plurality of slave devices can be executed at a given time point in the master device. Such communication cycles are divided into four classes such as {1-Request, 1-Response}, {1-request, Multi-Request}, {1-Notification} and {Repeated-Notification}.

Figure 5:
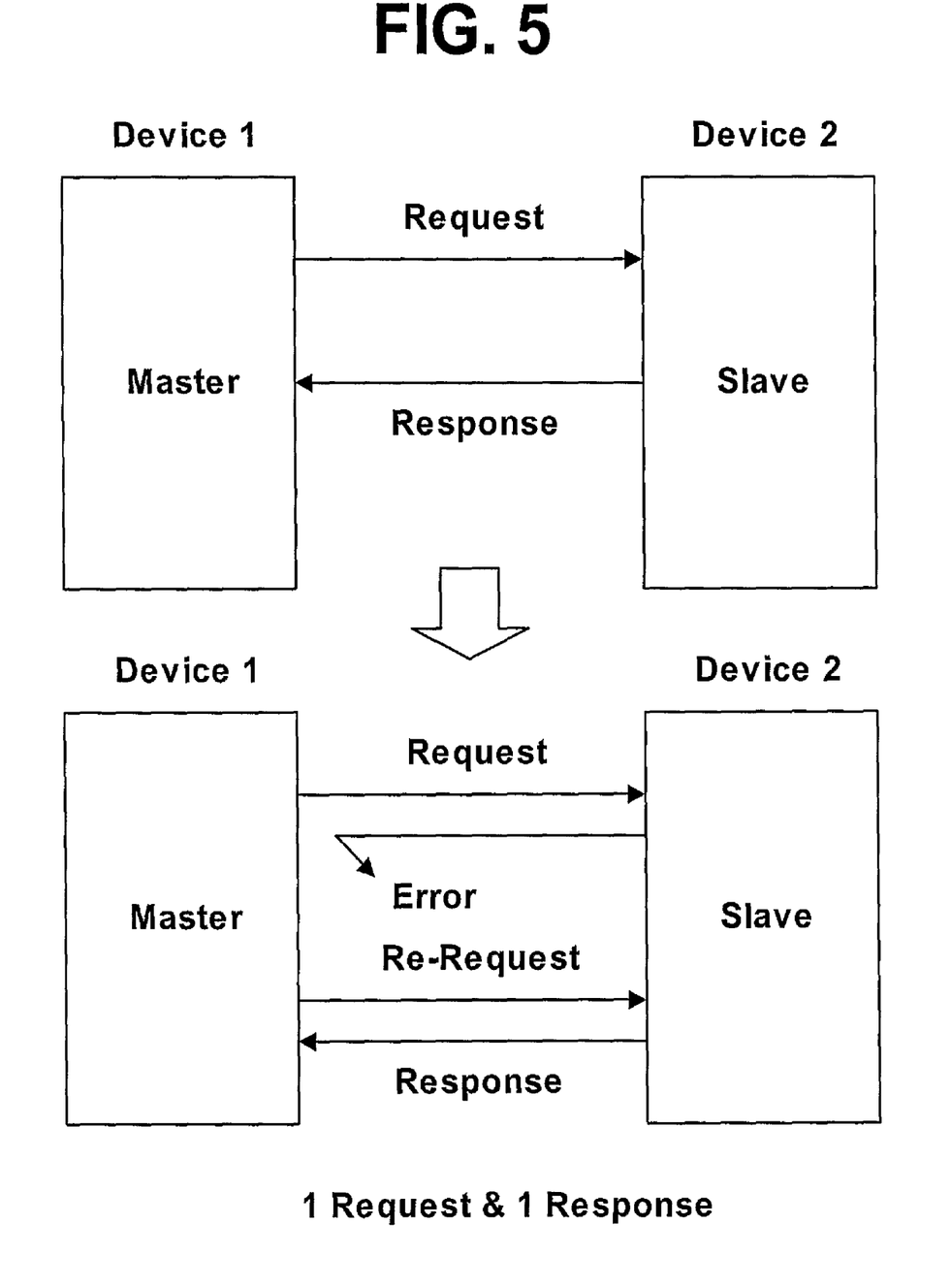
FIGS. 5 to 7 illustrate embodiments for a communication cycle service applied to the present invention.

For example, the communication cycle {1-Request, 1-Response} refers to a communication cycle in which one master device transmits one request packet to one slave device, and the slave device transmits a response packet to the master device in response thereto. If there occurs an error in the received packet, as shown in FIG. 5, the master device transmits a re-request packet to the slave device, and the slave device retransmits a response packet in response thereto.

Figure 6:
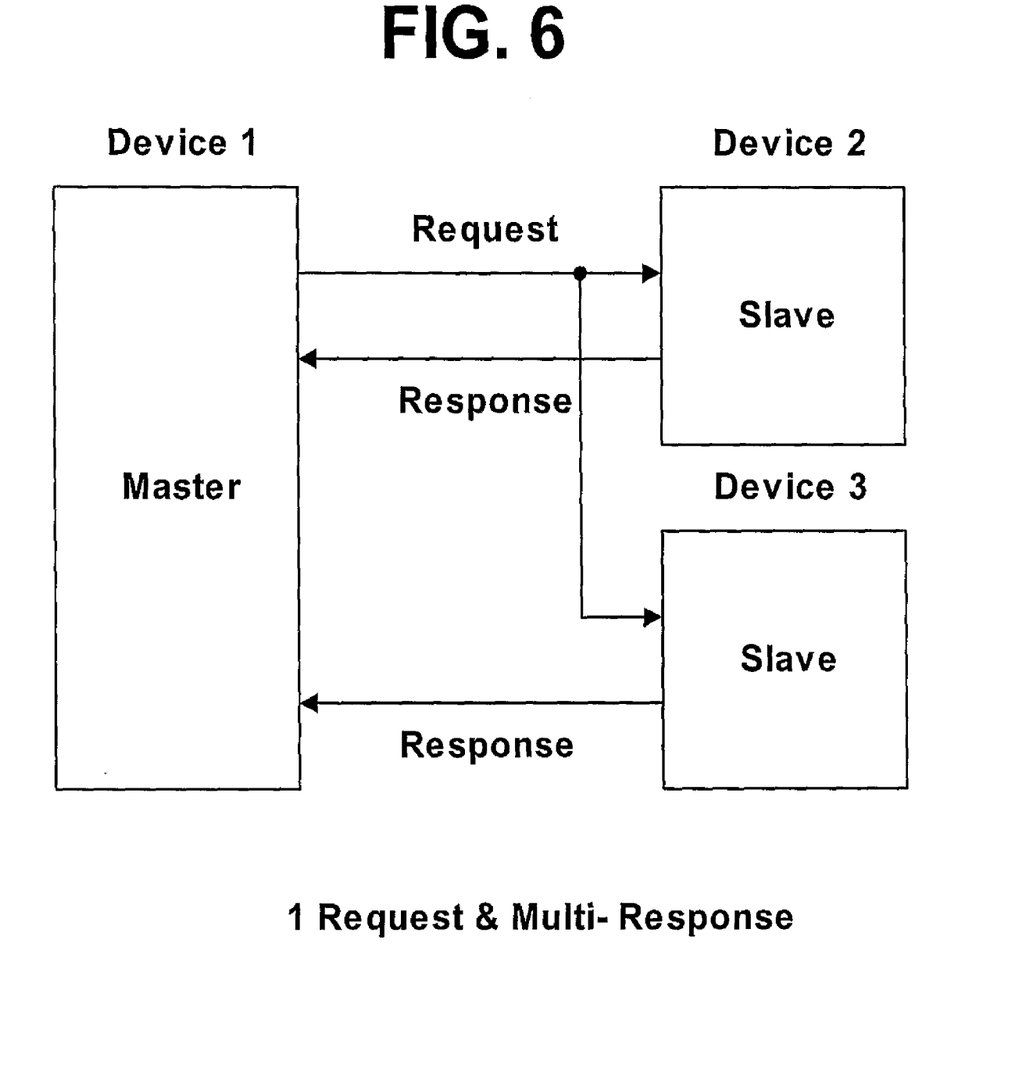

In addition, as shown in FIG. 6, the {1-request, Multi-Request} refers to a communication cycle in which one master device transmits one request packet with a group address to multiple slave devices, and each of the slave devices transmits a response packet in response thereto. The master device completes the communication cycle after the available maximum receiving time elapses. At this time, even if there occurs an error in the response packet received from the slave device, the master device does not respond thereto.

Figure 7:
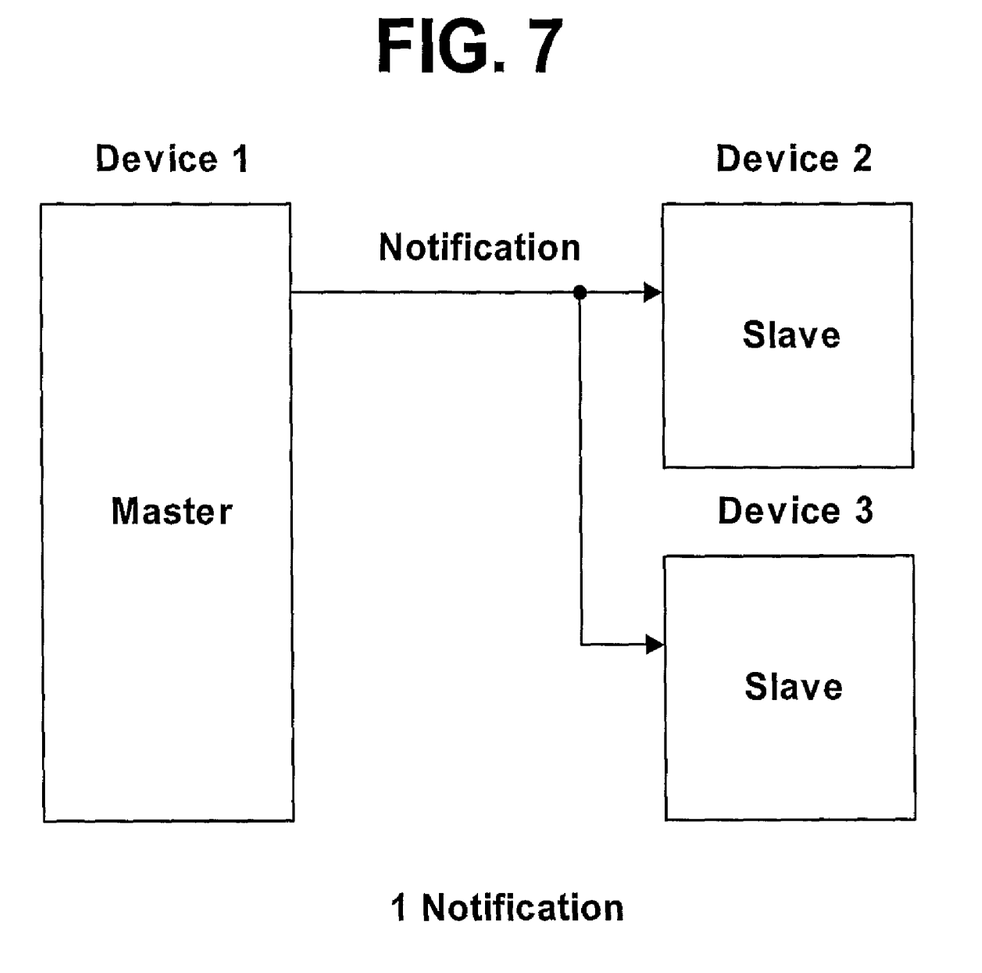

Moreover, as shown in FIG. 7, the communication cycle {1-Notification} refers to a communication cycle in which one master device transmits one notification packet to one or multiple slave devices and then completes communications immediately, and the communication cycle {Repeated-Notification} refers to a communication cycle in which one master device repeatedly transmits the same packet and then completes communications so as to guarantee transmission reliability in the communication cycle {1-Notification}.

In the meantime, a function of flexible address management is supported in the LnCP network. For example, since an address is allocated to appliances provided with an LnCP function for each class when they are shipped from a factory, the appliances automatically configures a network without any user's intervention. At this time, since appliances belonging to the same class are initialized with the same address, a network manager has an algorithm for allocating a single unique address when connecting the appliances.

In addition, in the LnCP network, a unique group address is allocated to appliances belonging to the same class so that group communications are available using one message and that various kinds of appliances are classified into clusters as a user demands, and a group address can be allocated to each of the clusters.

Further, variable length packet communications are supported in the LnCP network. For example, in a case where contents such as application programs related to operations of appliances are downloaded, or data stored from the appliances are uploaded, the lengths of a packets are controlled using buffer size information on the appliances.

Furthermore, the LnCP network provides a standard message set. For example, a standard message set suitable for a variety of appliances is difined such that the master device can control other appliances, and the message set is divided into a common area message set for basic LnCP communications, an application area message set for supporting unique functions of appliances and a developer area message set for providing unique functions of manufacturers at the same time.

In the meantime, the message set described above may be extended as occasion demands, and a factor may be added to a previously defined message. A download and upload service, which is one of main features in the LnCP network according to the present invention, will be described in detail below.

First, in an application layer of the LnCP network according to the present invention, there is provided a download and upload service using variable length packet communication, which is capable of diving data by the size of a buffer contained in a device, and then sending and assembling the data, in case of a plurality of communication cycles such as downloads or uploads.

Further, a function of receiving data from a network layer is controlled to prevent an application layer buffer from being overflowed. For example, command codes for providing a download service includes "TotalPage" and "CurrentPage" as input factors, and a memory area for combining a message is previously allocated for each command code for downloads in a slave device for supporting the download service. The total number of the partitioned data becomes the TotalPage and a transmitted particular page becomes the CurrentPage.

Figure 8:
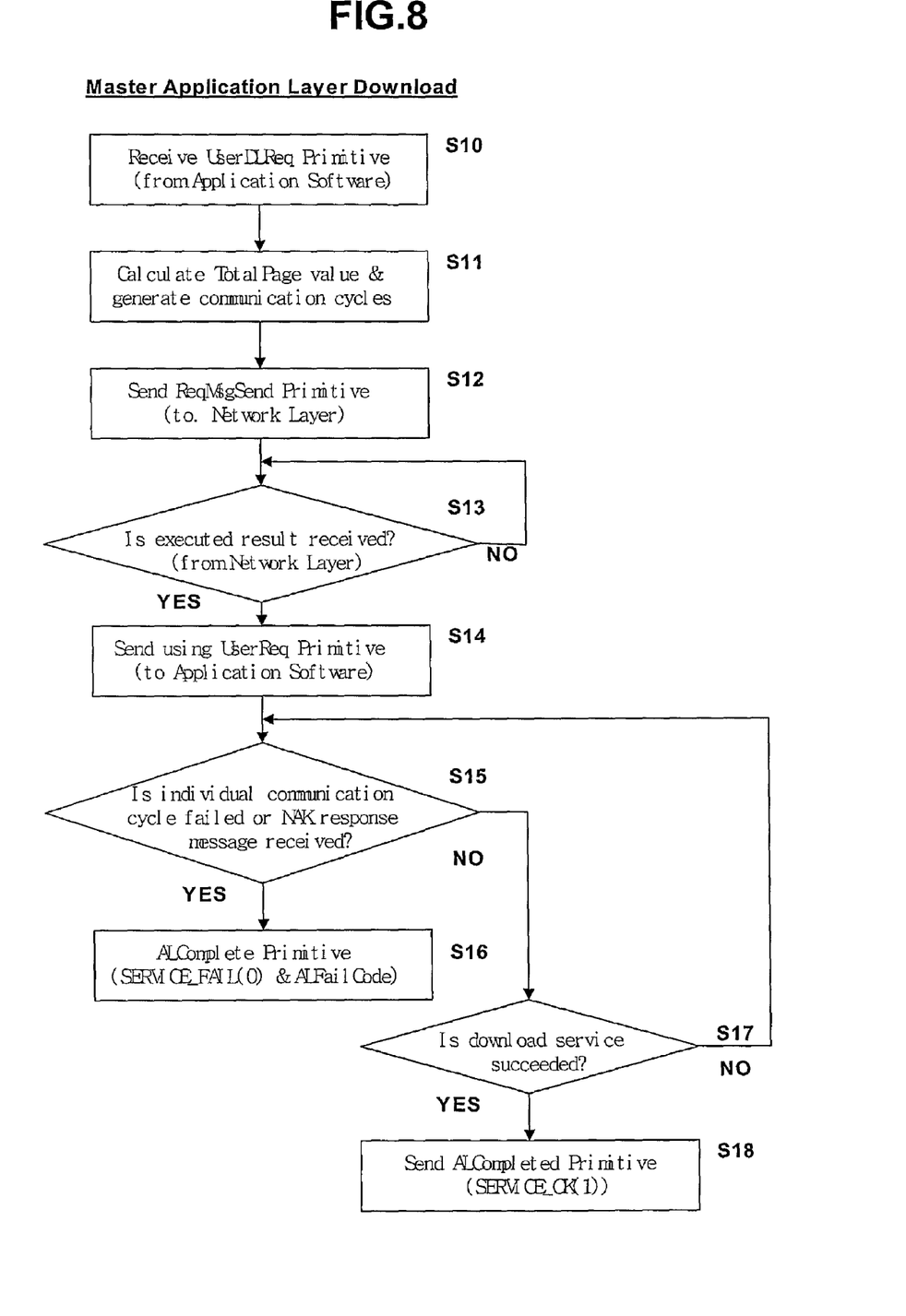
FIG. 8 illustrates an embodiment of a method for providing a download service in a master application layer according to the present invention.

As shown in FIG. 8, in a master application layer, if a UserDLReq (user download request) primitive is received from application software at operation S10, a download function corresponding thereto is implemented. After the number of the total communication cycles (TotalPage value) for downloads is calculated while dividing by the buffer size (BufferSize) byte in a download file (DownloadFile), a communication cycles with the same CycleID (cycle identifier) value is generated at operation S11.

In addition, while dividing as the unit of each of the communication cycles, a ReqMsgSend (request message sending) primitive is sent to a network layer at operation S12. Then, if an executed result of each of the communication cycles is received from the network layer at operation S13, a UserReq primitive is sent to application software at operation S14.

Further, before the download service is completed, if an individual communication cycle is failed, or an NAK (Negative Ack) response message is received at operation S15, the download service is determined to be failed so that an ALCompleted primitive including SERVICE_FAILED(0) and ALFailCode is sent to the application software. If the download service is successfully completed at operation S16, the ALCompleted primitive including SERVICE_OK(1) is sent to the application software at operation S17. As such, a series of download service operations are performed.

Figure 9:
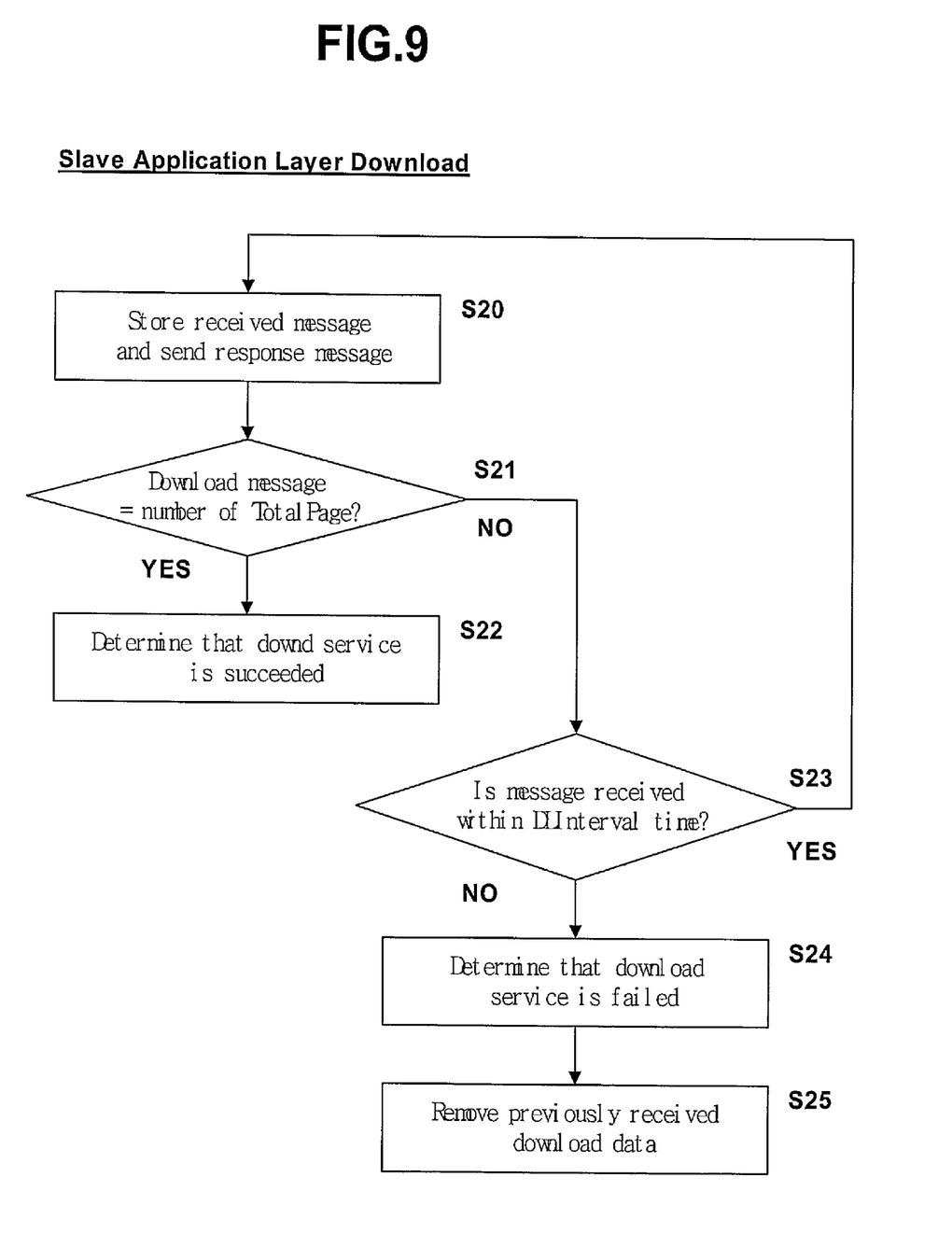
FIG. 9 illustrates an embodiment of a method for providing a download service in a slave application layer according to the present invention.

In the meantime, as shown in FIG. 9, in a slave application layer, received messages are sequentially recorded in a previously allocated memory, and a response message is sent at operation S20. Then, if download messages are received as many as the number of TotalPage at operation S21, the download service is determined to be succeeded at operation 22.

On the other hand, if another download request message is not received within a DLInterval time after one download request message is received at operation S23, the download service is determined to be failed at operation S24 so that the received download data is removed from the memory at operation S25.

Further, an upload service is provided in the LnCP network according to the present invention. For example, command codes for providing an upload service includes "PageNo" and "DataLength" as input factors, and a data area to be uploaded is previously allocated for each command code for uploads in a slave device for supporting the upload service.

Figure 10:
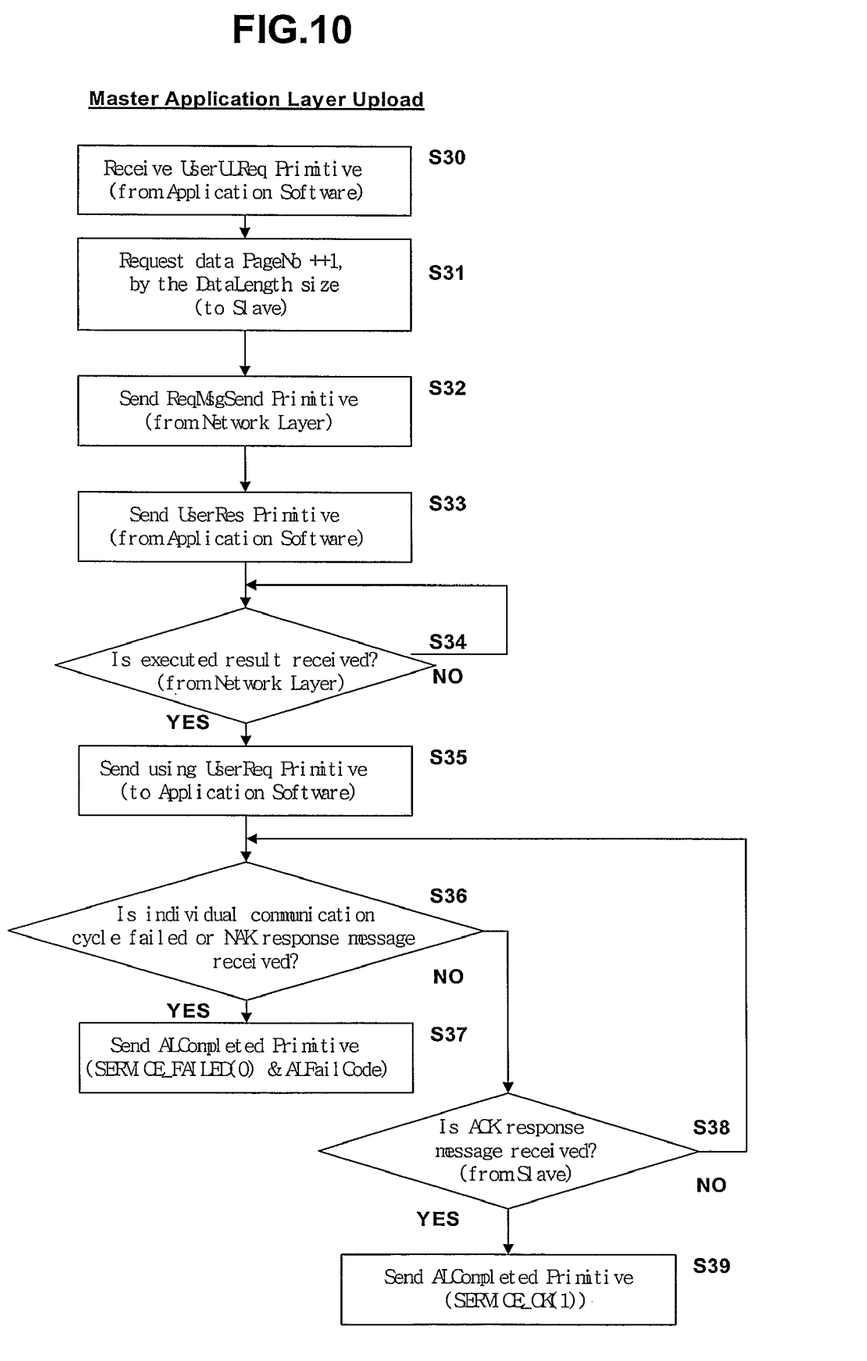
FIG. 10 illustrates an embodiment of a method for providing an upload service in a master application layer according to the present invention.

As shown in FIG. 10, in the master application layer, if a UserULReq primitive is received from application software at operation S30, an upload function corresponding thereto is implemented. In the master application layer, a PageNo value is increased by one from the number 1, and a request for transmitting upload data by the DataLength size included in the UserULReq primitive is made to a slave device at operation S31.

In addition, while dividing by the communication cycle, a ReqMsgSend primitive is sent to a network layer at operation S32, and a UserRes (user response) primitive is sent to the application software at operation S33. Then, if an executed result of each of the communication cycles is received from the network layer at operation S34, a UserReq primitive is sent to application software at operation S35.

Further, before the upload service is completed, if an individual communication cycle is failed, an NAK (Negative Ack) response message is received at operation S36, the upload service is determined to be failed so that an ALCompleted primitive including SERVICE_FAILED(0) and ALFailCode is sent to the application software at operation S37. If an ACK response message with no data is received at operation S38, the upload service is determined to be successfully completed so that the ALCompleted primitive including SERVICE_OK(1) is sent to the application software at operation S39.

Figure 11:
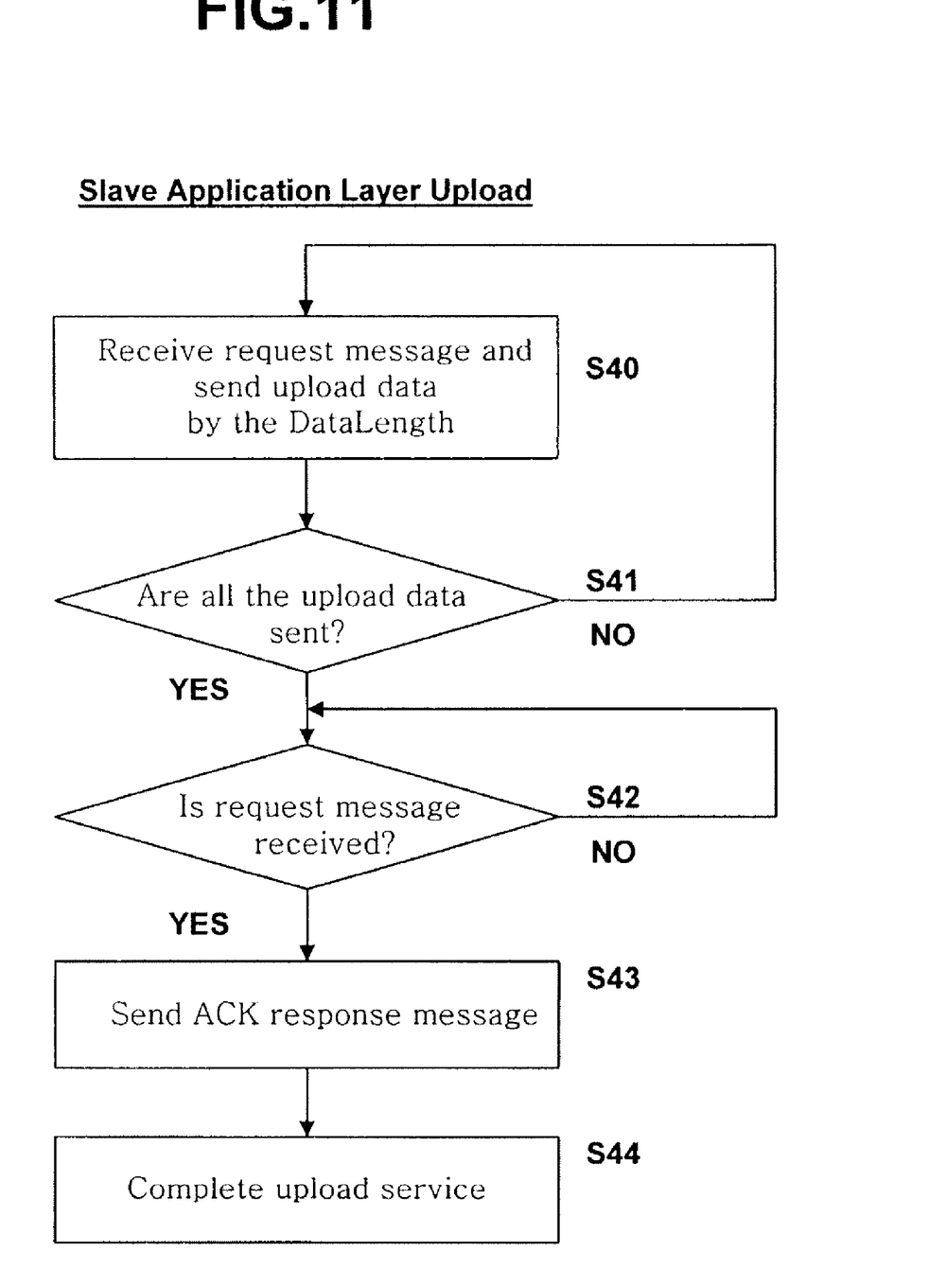
FIG. 11 illustrates an embodiment of a method for providing an upload service in a slave application layer according to the present invention.

In the meantime, in the slave application layer, in a case where an upload function is implemented as shown in FIG. 11, upload data is contained by the DataLength in a response message and then sent to the master device whenever a request message is received at operation S40. After all the upload data are sent at operation S41, if the request message is received S42, an ACK response message with no data is sent to the master device at operation S43 so that the upload service is successfully completed at operation S44.

Further, in the present invention, the receiving buffer of each of the layers is allowed to be shared such that the slave device is executed even in a micro controller with a low performance, and thus an overflow may be generated in the buffer of each of the layers in case where continuous data is received from the network layer. To prevent this, a function of temporarily suspend data reception from the network layer is implemented when one message is received from the network layer.

As described above, according to the present invention, there is provided a method for providing a download and upload service in a network control system, wherein convenience of remote control and supervision can be provided to a user, and a download and upload service for various appliances connected through the living network can be more effectively executed.

As describe above, while the present invention has been disclosed for the purpose of illustration with reference to the aforementioned preferred embodiment, more various appliances can be connected to a living network, which may be referred to as another network of a different name, according to the present invention and it will be understood by those skilled in the art that the foregoing embodiment can be improved, modified, substituted or added in a variety of ways without departing from the technical spirit and scope of the invention as defined by the appended claims.

The invention claimed is:

1. A method for transmitting data to a slave device communicating with a master device according to a living network control protocol, the method performed by the master device and comprising:
receiving a command instructing the master device to perform a transmitting operation, the transmitting operation transmitting specific data from the master device to the slave device,
wherein the master device controls the slave device and the slave device responds to a request of the master device;
obtaining a total page by dividing a size of the specific data transmitted by the transmitting operation with a buffer size of the master device;
obtaining at least one of divided data by dividing the specific data with the buffer size;
generating at least one message,
wherein each message comprises a different part of the divided data, the total page, a current page, and a cycle identifier,
wherein the current page discerns each message,
wherein each message generated by the same transmitting operation includes a different current page,
wherein the cycle identifier discerns the transmitting operation, and
wherein each message generated by the same transmitting operation includes the same cycle identifier; and
transmitting each generated message from the master device to the slave device.

2. The method according to claim 1, further comprising generating a result message indicating an executed result of each of the transmitted messages.

3. The method according to claim 2, further comprising generating a completion-informing message, when the transmitting operation is successfully completed.

4. The method according to claim 2, further comprising generating a failure-informing message, when at least one of the message is failed or a failure response is received before the transmitting operation is completed.

5. A method for performing a transmitting operation of specific data from a master device to a slave device, the slave device communicating with a master device according to a living network control protocol, the method performed by the slave device and comprising:
receiving, from the master device, a plurality of a messages generated by the transmitting operation, the message including a total page, a current page, and a cycle identifier,
wherein the total page indicates a total number of the messages and the total page is obtained at the master device by dividing a size of specific data to be transmitted from the master device to the slave device by the transmitting operation with a buffer size of the master device,
wherein the current page discerns each of the messages,
wherein each of the messages generated by the transmitting operation includes a different current page,
wherein each of the messages includes a different part of the specific data divided by the buffer size,
wherein the cycle identifier discerns each of the transmitting operation,
wherein the plurality of the messages generated by the same transmitting operation includes the same cycle identifier,
determining whether the transmitting operation is completed based on the received total page,
when the transmitting operation is determined to be failed, removing the received message.

6. A master device for transmitting specific data to a slave device communicating with the master device according to a living network control protocol, the master device comprising:
an interface unit; and
a processor configured to;
receive a command instructing the master device to perform a transmitting operation, the transmitting operation transmitting specific data from the master device to the slave device,
wherein the master device controls the slave device and the slave device responds to a request of the master device,
obtain a total page by dividing a size of the specific data transmitted by the transmitting operation with a buffer size of the master device,
obtain at least one of divided data by dividing the specific data with the buffer size,
generate at least one message,
wherein each message comprises a different part of the divided data, the total page, a current page, and a cycle identifier,
wherein the current page discerns each message,
wherein each message generated by the same transmitting operation includes a different current page,
wherein the cycle identifier discerns the transmitting operation, and
wherein each message generated by the same transmitting operation includes the same cycle identifier, and transmit, via the interface unit, each generated message from the master device to the slave device.

7. The master device according to claim 6, wherein the processor further generates a result message indicating an executed result of each of the transmitted message.

8. The master device according to claim 7, wherein the processor further generates a completion-informing message, when the transmitting operation is successfully completed.

9. The master device according to claim 7, wherein the processor further generates a failure-informing message, when the at least one message is failed or a failure response is received before the transmitting operation is completed.

10. A slave device for receiving specific data from a master device communicating with the slave device according to a living network control protocol, the slave device comprising:
   an interface unit; and
   a processor configured to;
   receive, via the interface unit, from the master device, a plurality of messages generated by a transmitting operation, the messages including a total page, a current page, and a cycle identifier,
   wherein the total page indicates a total number of the messages and the total page is obtained at the master device by dividing a size of specific data transmitted from the master device to the slave device by the transmitting operation with a buffer size of the master device,
   wherein the current page discerns each of the messages,
   wherein each of the messages generated by the transmitting operation includes a different current page,
   wherein each of the messages includes a different part of the specific data divided by the buffer size,
   wherein the cycle identifier discerns each of the transmitting operation,
   wherein the plurality of the messages generated by the same transmitting operation includes the same cycle identifier,
   determine whether the transmitting operation is completed based on the received total page, and
   when the transmitting operation is determined to be failed, remove the received messages.

* * * * *